(12) United States Patent
Protassov et al.

(10) Patent No.: US 7,941,813 B1
(45) Date of Patent: May 10, 2011

(54) SYSTEM AND METHOD FOR USING VIRTUAL MACHINE FOR DRIVER INSTALLATION SANDBOX

(75) Inventors: Stanislav S. Protassov, Moscow (RU); Alexander G. Tormasov, Moscow (RU); Serguei M. Beloussov, Singapore (SG)

(73) Assignee: Parallels Holdings, Ltd. (BM)

( * ) Notice: Subject to any disclaimer, the term of this patent is extended or adjusted under 35 U.S.C. 154(b) by 1041 days.

(21) Appl. No.: 11/673,585

(22) Filed: Feb. 11, 2007

Related U.S. Application Data

(60) Provisional application No. 60/774,216, filed on Feb. 17, 2006.

(51) Int. Cl.
*G06F 3/00* (2006.01)
*G06F 21/00* (2006.01)
*G06F 13/00* (2006.01)

(52) U.S. Cl. ............ 719/321; 719/328; 719/324; 711/6; 710/33

(58) Field of Classification Search ......................... None
See application file for complete search history.

(56) References Cited

U.S. PATENT DOCUMENTS

| | | | |
|---|---|---|---|
| 7,082,598 B1 * | 7/2006 | Le et al. | 717/127 |
| 7,111,086 B1 * | 9/2006 | Ecoleston et al. | 710/33 |
| 7,500,048 B1 * | 3/2009 | Venkitachalam et al. | 711/6 |
| 2005/0289316 A1 * | 12/2005 | Durham et al. | 711/170 |
| 2006/0117325 A1 * | 6/2006 | Wieland et al. | 719/321 |
| 2006/0136720 A1 * | 6/2006 | Armstrong et al. | 713/164 |
| 2006/0288168 A1 * | 12/2006 | Stevenson | 711/115 |
| 2007/0074226 A1 * | 3/2007 | Zimmer et al. | 719/321 |
| 2007/0113218 A1 * | 5/2007 | Nolan et al. | 717/124 |

* cited by examiner

*Primary Examiner* — H. S. Sough
*Assistant Examiner* — Tuan Dao
(74) *Attorney, Agent, or Firm* — Bardmesser Law Group

(57) ABSTRACT

A method, system and computer program product for providing driver functionality in computing system includes installing an operating system on the computing system; forming a plurality of isolated sandboxes running on the computing system under control of the operating system; during an attempt to install a driver, installing driver stub in the operating system; installing the driver in one of the isolated sandboxes, wherein the driver directly uses at least part of system resources; using a gateway between the driver stub and the installed driver to provide an interface for transmitting requests from the driver stub to driver.

28 Claims, 8 Drawing Sheets

SYSTEM AND METHOD FOR USING VIRTUAL MACHINE FOR DRIVER INSTALLATION SANDBOX

CROSS-REFERENCE TO RELATED APPLICATION

The present application claims priority to U.S. Provisional Patent Application No. 60/774,216, filed Feb. 17, 2006, entitled SYSTEM AND METHOD FOR USING VIRTUAL MACHINE FOR DRIVER INSTALLATION SANDBOX, which is incorporated herein by reference in its entirety.

BACKGROUND OF THE INVENTION

1. Field of the Invention

This invention relates to a method and system for improving security of operating systems in computing systems running sandboxes.

2. Description of the Related Art

One of the problems of a modern operating system development is dealing with third-party device drivers. Typically, an operating system vendor, such as Microsoft, the developer of MS WINDOWS, and the various providers of LINUX, have to allow third party vendors to incorporate, or import, their drivers into operating system kernel address space. Quite often, the quality of the code of these drivers is rather uneven—with the proliferation of vendors of hardware—video cards, Wi-Fi cards, digital cameras, mobile phones, etc.—the number of device drivers increases as well, while the skill set of the developers of these drivers is often mediocre.

The problem arises in that the operating system kernel address space is monolithic. Therefore, the operating system kernel has no realistic choice, other than to locate the device driver within the same operating system kernel space as other OS kernel code. Thus, any errors, mistakes, bugs, etc. in the driver itself can crash the computer system, can "hang it up," can result in other errors, such as attempts to access a memory location that should not be accessed, or one that does not exist, resulting in an exception or an interrupt, etc. The operating system vendor, nonetheless, has no realistic choice, since placing the driver in user space means that the overhead penalty would be unacceptable.

One of the conventional approaches of dealing with this problem is exemplified by the XEN approach, where a service operating system, or a number of service operating systems, are launched in a Virtual Machine environment. In this approach, one Virtual Machine can be assigned to one driver. This provides some measure of fault isolation. However, the XEN approach has not become popular in the industry, in part because of the complexity of the administration and support, and in part because each XEN Virtual Machine/domain has its own full-fledged operating system. This feature limits the potential for scalability.

INTEL® Virtualization Technology provides for running multiple "virtual" systems, e.g., multiple operating systems on a single hardware platform. This technology is hardware supported and provides hardware enhancements built into Intel's server platforms.

Another conventional approach goes back to the 1980s, and involves the use of microkernels. Some examples of microkernels are the GNU Hurd project, the Mach operating system kernel and others known in the art. In essence, true microkernels divide the monolithic kernel address space into several address spaces. This is a workable approach in theory, however, in practice, modern hardware processor architecture does not directly support efficient non-monolithic kernel address space. Therefore, as a practical matter, the true microkernel approach is more of a theoretical interest than a practical, commercially-realized idea.

SUMMARY OF THE INVENTION

Accordingly, the present invention is related to a system and method for using Virtual Machines as a driver installation sandbox that substantially obviates one or more of the disadvantages of the related art.

In one aspect, there is provided a system, method and computer program product for providing driver functionality in a computing system, including installing a full-functional operating system on the computing system; forming a plurality of isolated sandboxes running under control of a common supporting means; during an attempt to install a driver in the operating system, installing a driver stub in the operating system; installing the driver in one of the isolated sandboxes; and using a gateway between the driver stub and the installed driver to provide an interface for transmitting requests from the driver stub to the driver and responses back from the driver to the operating system.

Optionally, the driver directly uses at least some system resources that can include hardware resources, such as I/O addresses, or interrupts and software resources, such as OS structures. A controlled memory area shared for common access of the operating system and/or at least some of the sandboxes and may be used for effective communication. Parameters of the controlled memory area are dynamically changed, including any of its access level, contents, size, location and sharing mode. The operating system and the sandboxes have memory spaces that are at least partially isolated from each other. The computing system further can include at least two drivers installed in different sandboxes. The driver allocates resources on the OS kernel level, or with OS kernel privilege level and allocated resources are associated in OS kernel with driver stub. The sandboxes can be implemented as isolated Virtual Machines running on the computing system, and common supporting means includes using one of a Virtual Machine Monitor and/or a Hypervisor. The sandboxes can share system resources.

In another aspect, a system for managing driver installation includes a full-fledged operating system running on the computing system with operating system (OS) kernel; an isolated sandbox; a driver running in the sandbox; a gateway that provides an interface from the OS kernel to the driver in the sandbox; an API redirection module that redirects driver calls via the gateway to the isolated sandbox and returns results of driver calls from the sandbox via the gateway. The driver calls are issued by user applications and/or by other drivers.

In another aspect, a method for installing a driver includes initiating an isolated sandbox; launching a driver in the isolated sandbox; using a gateway that interfaces from the OS kernel to the driver in the isolated sandbox; and initiating an API redirection process that redirects driver calls to the isolated sandbox via the gateway and returns a result of driver call from the isolated sandbox via the gateway.

In another aspect, a computer useable medium for providing driver functionality, the computer useable medium having computer program logic stored thereon and executing on at least one processor, the computer program logic includes computer program code means for installing an operating system on the computing system; computer program code means for forming a plurality of isolated sandboxes running on the computing system under control of the operating system; during an attempt to install a driver, computer program code means for installing driver stub in the operating system; computer program code means for installing the driver in one of the isolated sandboxes, wherein the driver directly uses at least part of system resources; and computer program code means for using a gateway between the driver stub and the installed driver to provide an interface for transmitting requests from the driver stub to driver.

In another aspect, a method for installing a driver includes, on a computer having an operating system running in operating system kernel space, initiating a Virtual Machine running in user space; launching a driver in the Virtual Machine; initiating a gateway that interfaces to the driver; and initiating a redirection module that redirects driver calls from a user application to the gateway and returns a result of the driver call from the gateway back to the user application.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1A:
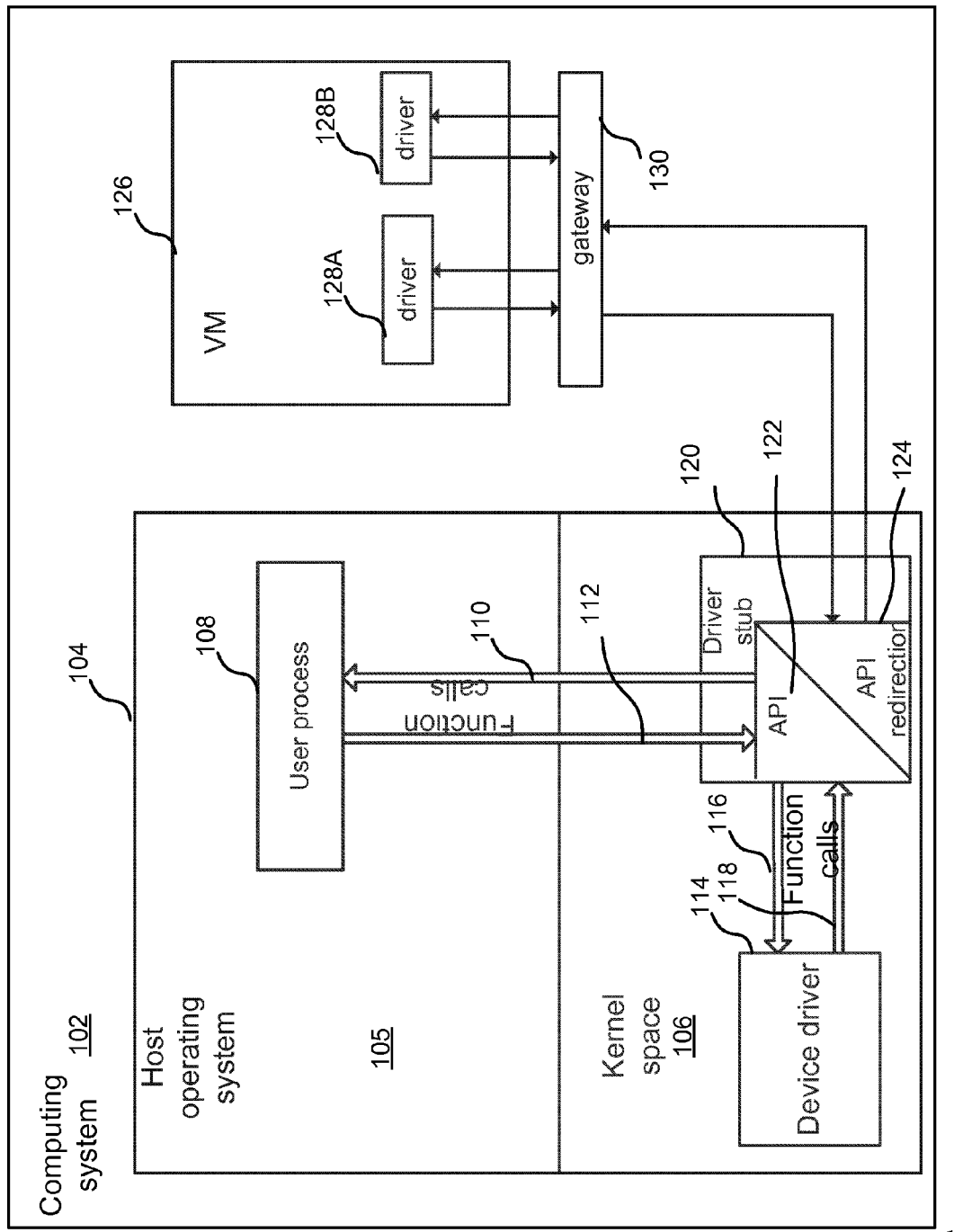
FIG. 1A illustrates one exemplary embodiment of the invention.

Reference will now be made in detail to the preferred embodiments of the present invention, examples of which are illustrated in the accompanying drawings.

Thus, the present invention is directed to the use of Virtual Machine technology to implement secure sandboxes used for installation of third party drivers. The use of Virtual Machine technology makes it possible to load and install a driver into what is essentially a very-limited purpose operating system—unlike full featured operating systems that can be installed into Virtual Machines that they are normally designed to emulate (or otherwise virtualize).

To perform the operations, sandboxes may be configured during the boot loading of the computing system or during the boot loading of the operating system. In one embodiment, the sandbox may be formed using a preconfigured snapshot of the virtual machine, ready for use or configured after starting the virtual machine from a snapshot that provides for fast sandbox installation. Also, a snapshot of virtual machine may be used for error recovery, replication of drivers and other purposes. As another alternative, preconfigured sandbox snapshots may be used.

In the present invention, the term "operating system" is being used in the definition "limited OS" or "limited purpose OS" to define a software component required just for driver operability, and which does not need to perform most other basic tasks of operating system, although such limited functionality is not a strict requirement of such an "operating system." For example, such an operating system can be limited essentially to little more than being able to handle the activities of the third party driver. In some embodiments of the invention, the "limited OS" can provide for running user processes along with the installed drivers. This "limited OS" can be integrated with the Primary (host) OS. For example, the limited OS can share kernel services and/or kernel memory with the Primary OS.

The preferred embodiments of the invention can use conventional Virtual Machines known in the art or similar constructs. Some examples of software being able to support basic Virtual Machines are VMware Virtual Machine technology/Virtual PC (e.g., binary translation/direct execution), XEN or Parallels Software International, Inc., VM (e.g., software debugging/direct execution) technology, although the invention is not limited to any particular virtualization technology. Also, Intel VT, or AMD Pacifica technology, or similar hardware-supported virtualization mechanisms are examples of hardware means for supporting sandboxes described herein.

The limited-purpose operating system inside the Virtual Machine serves to communicate with the primary operating system (through a Virtual Machine Monitor (VMM), through a Hypervisor, see U.S. application patent Ser. No. 11/348,382; Filed: Feb. 7, 2006, incorporated herein by reference in its entirety, or through some other mechanism), and provides for memory management related to shared memory access with the main OS kernel memory. The limited-purpose operating system also provides access to various structures of the Primary Operating System, and also provides various function calls and service calls of the primary operating system, through which the driver does its actual work, optionally provide parsing and alteration of function call parameters and return values.

FIG. 1A illustrates one exemplary embodiment of the invention. As shown in FIG. 1A, a computing system 102 includes a host operating system (HOS) 104, which has a user space 105 and a kernel space 106. A user process 108 is running in the user space 105, and attempt to access a device driver 128A or 128B using a function call 112 (e.g., system call) direct or indirect. In another embodiment, the function call to drivers 128A or 128B may be issued by the device driver 114. Normally, the function call 112 returns the results of that function 110 to the user process 108 or to device driver 114. The device driver 128A or 128B normally communicates with the user process 108 or other processes, such as the device driver 114, using an application process interface (API) 122, which normally forwards the results of the function call 112, 116 from the driver 128A or 128B using paths 118, 110, back to the process that issues function call or to operating system procedures. As further shown in FIG. 1A, rather than directing the function calls 112, 116 to the drivers 128A or 128B, a driver stub 120 is added to the architecture, which has a module 124 for API redirection. An application programming interface (API) is a runtime code interface that a computer system or program library provides in order to support requests for services to be made of it by a computer program. The software that provides the functionality described by an API is said to be an implementation of the API. The API itself is an abstract construct, in that it specifies an interface, parameters, length, types, etc. and does not get involved with implementation details.

A Virtual Machine 126 is also running on the computing system 102, which may have a Virtual Machine monitor (VMM), not shown in this figure, or another interface to the operating system 104. The function calls 112 are redirected by the API redirection module 124 to a gateway 130. The gateway 130 is an interface to the Virtual Machine 126, and more particularly, to the drivers 128. The gateway 130 may be viewed as a part of Virtual Machine monitor, or VMM or Hypervisor of any type. Although a full VMM can be used as a gateway 130, a substantially more limited VMM can preferably be used. In essence, the gateway 130 knows the addresses at which the drivers 128 are located, and knows the parameters that those drivers expect when called, as well as the output parameters of those drivers, also, the gateway 130 knows how to interface to the operating system APIs with the driver 128 parameters.

The gateway 130 then interfaces with drivers that are located within the Virtual Machine, such as through the device drivers 128A, 128B. The results are returned, through the gateway 130, back to the driver stub 120, and then back to the user process 108, or to the device driver 114 as shown in FIG. 1A.

In some embodiments of the invention, where user processes run in the sandbox, additional communication means may be created to tie the user processes to the primary operating system, for example additional memory sharing between Virtual Machine and Primary OS user process may be used. As one example, the gateway 130 can provide such functionality In one embodiment, the gateway is available to receive, data, and pack and unpack data in a computing system's memory when data is transmitting from the operating system to the driver in the sandbox and back. Such an implementation of the gateway may be done, e.g., during API call processing.

Although the present invention is related mainly to computing systems being implemented as an integrated hardware set, other embodiments are possible. For example, the sandbox may be created on a remote computing system and the gateway may include network communication means. The implementation where computing system is implemented as a computer cluster is also possible.

Figure 1B:
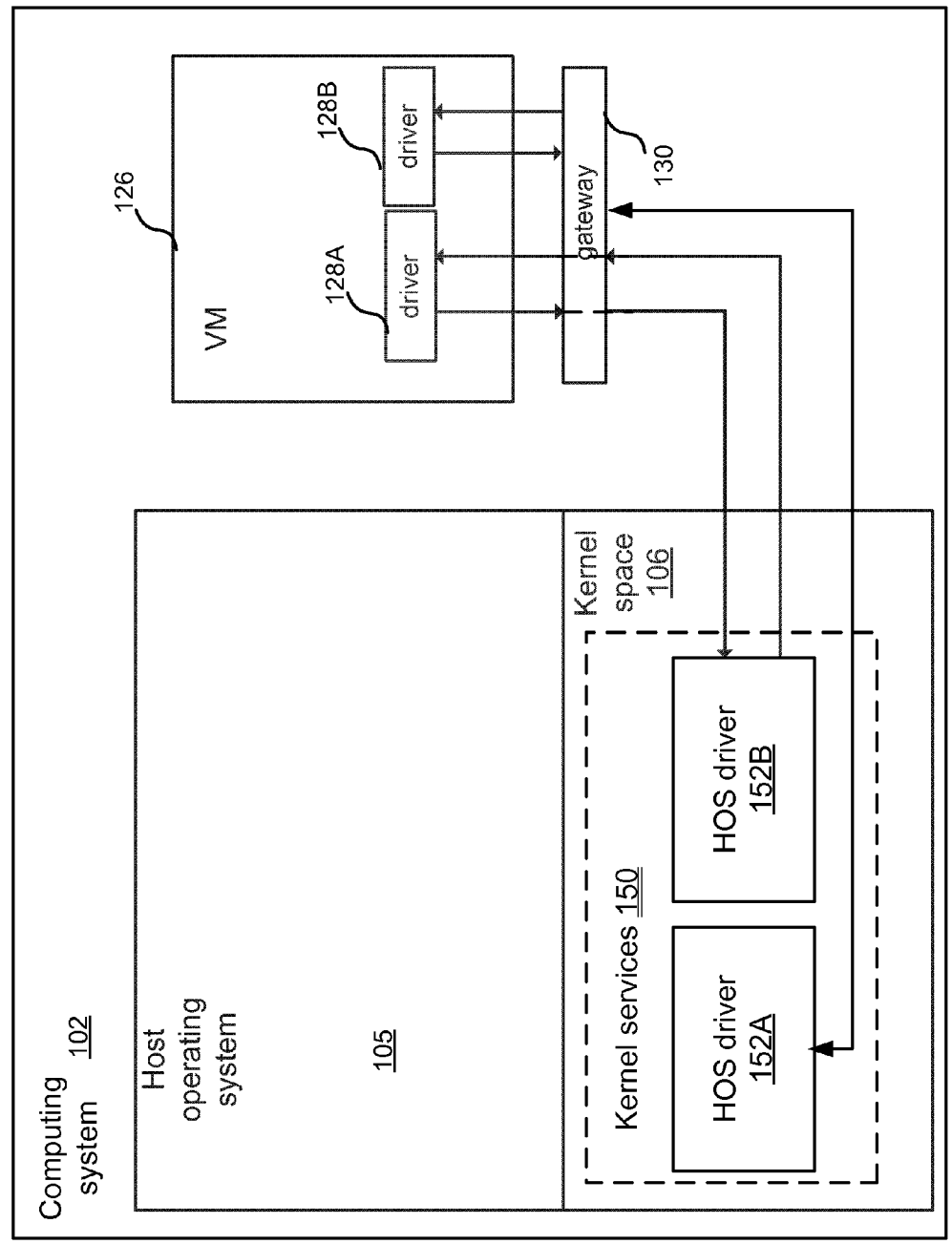
FIG. 1B illustrates an embodiment of the invention related to handling of requests issued by the driver installed in a sandbox.

FIG. 1B illustrates another aspect of the invention, related to driver call execution. This figure shows a case when driver call execution requires call for another driver in Host OS (Primary OS) space. As shown in FIG. 1B, in kernel space 106, a set of OS kernel services 150 is activated. In one embodiment, in the kernel services module 150, the host operating system drivers 152A, 152B are activated. Those drivers also may be activated as a part of the Primary Operating System. Those drivers then interface to the gateway 130, in the same manner as described above with reference to FIG. 1A. Such an operation improves stability of the computing system 102, which can run a plurality of sandboxes along with the already-installed operating system. Thus, not only would sandboxes not corrupt content of other sandboxes and/or content of the operating system, but even the host operating system 105 itself could not corrupt content of sandboxes. These advantages are achieved without a need to translate object code, or otherwise providing monitoring or controlling code execution, while using drivers from sandboxes context or operating system context. On the other hand, isolation provides for possibly improved on-the-fly error correction and recovery, since the gateway is only responsible for transmitting requests, and sandboxed code may be patched, corrected and/or replaced by snapshotted data without notification of the user and without critical interruption of user code execution since, for example, data used by the gateway would not be lost due to an error arising in the sandbox and may be used repeatedly.

Figure 2A:
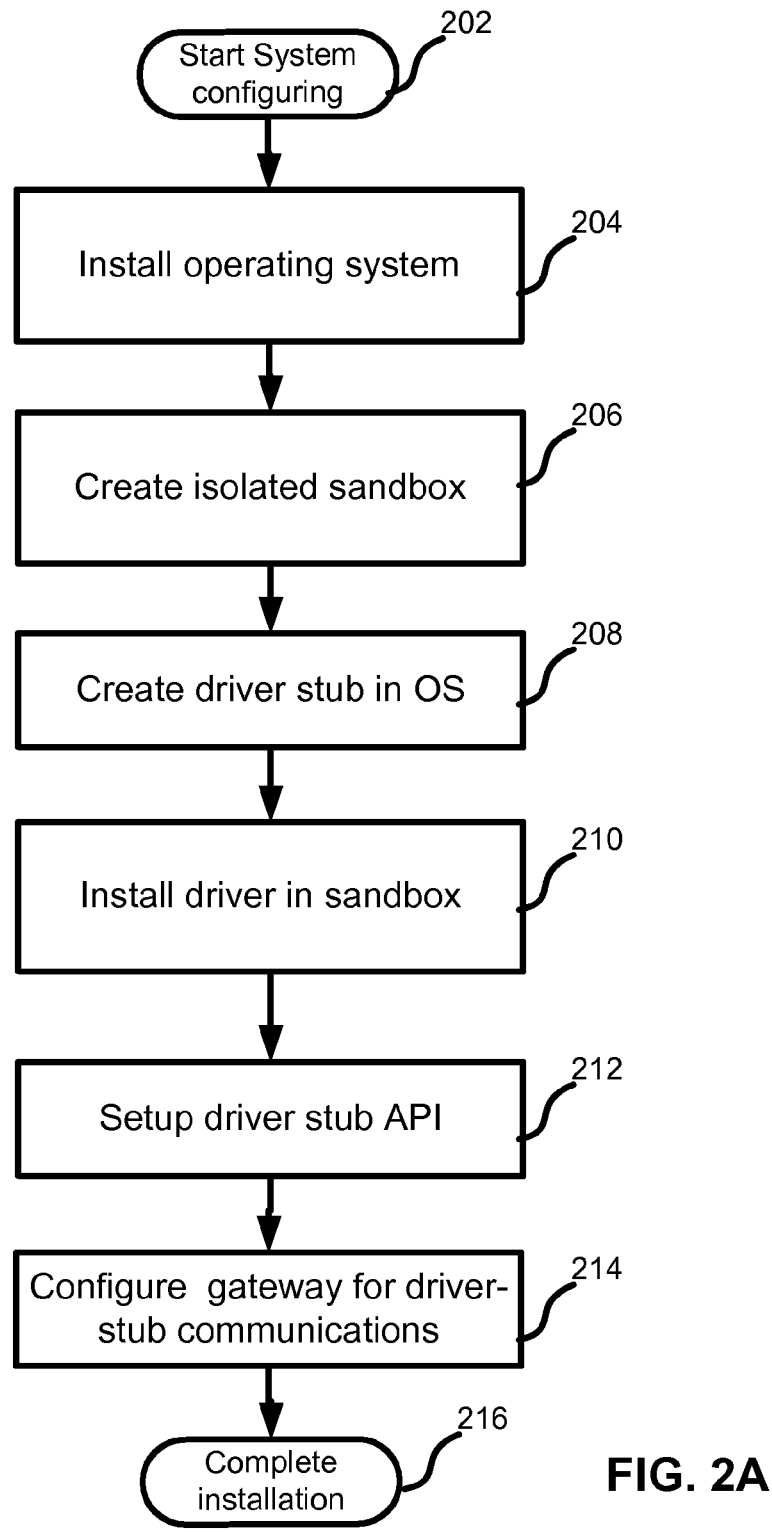
FIG. 2A illustrates the process of installation of the driver into the sandbox, such as a Virtual Machine.

FIG. 2A illustrates the process of installation of the driver into the sandbox, such as a Virtual Machine. As shown in FIG. 2A, after step 202 (initiation of system configuration), the operating system is installed onto the computing system (step 204). The Virtual Machine is then created and launched as an isolated sandbox (step 206). A driver stub is then created in the operating system (step 208). The stub exists in the low-level kernel space and may be accessed from any of the sandboxes where driver installation is performed. The stub provides access to functionality of "sandboxed" drivers 128 via the gateway 130.

The driver 128 may then be installed in the sandbox 126 (i.e., in the Virtual Machine) (step 210) or the driver 128 may have been previously installed. A driver stub 120 is then set up, and the API redirection 124 is configured (step 212). The gateway 130 is then configured for facilitating communication between the driver 128 and the driver stub 120 (step 214). The installation is then complete (step 216).

Figure 2B:
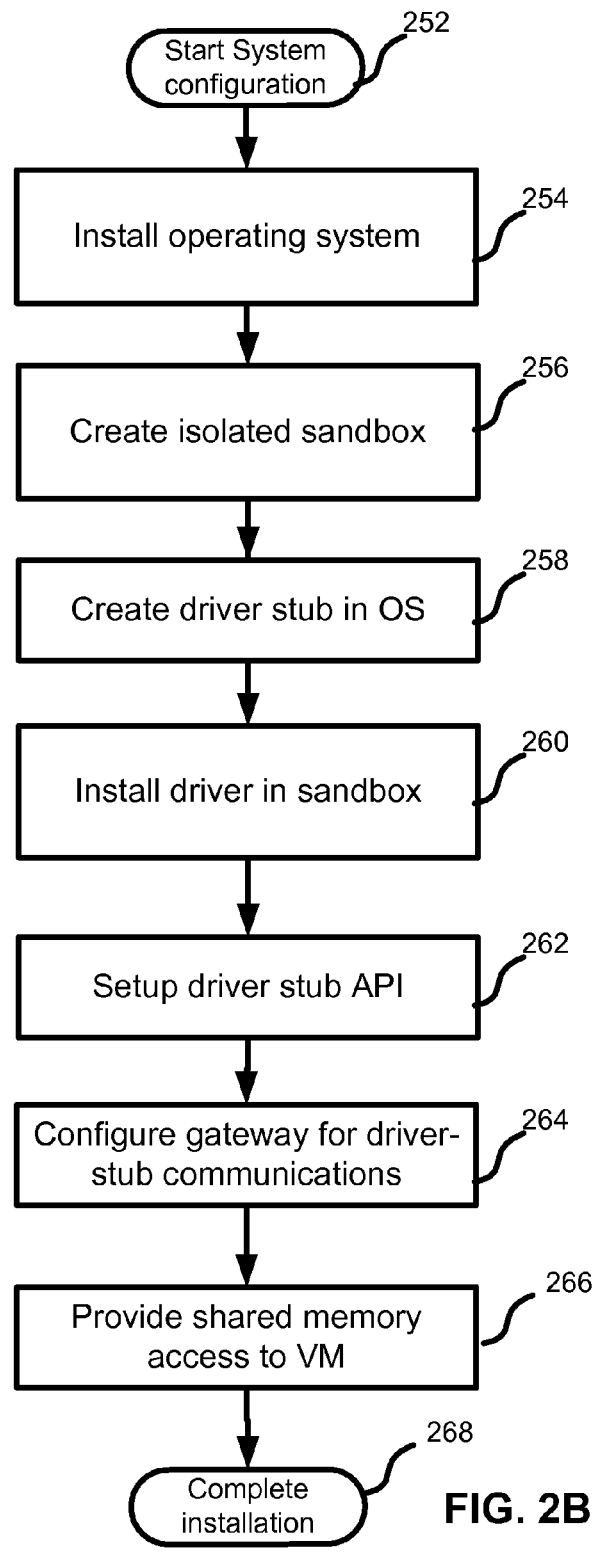
FIG. 2B illustrates an alternative algorithm for implementing the invention.

FIG. 2B illustrates an alternative algorithm for implementing the invention. As shown in FIG. 2B, once the system configuration process starts in step 252, the operating system 105 (for example, the host operating system), is installed (step 254). In step 256, an isolated sandbox, such as a Virtual Machine 126, is activated. Typically, the Virtual Machine 126 is allocated its own physical address space, which neither the operating system 105 nor user applications otherwise interact with (except for the sandbox driver discussed herein). In step 258, the driver stub is created in the operating system, see 120 in FIG. 1A. In step 260, the drivers 128A, 128B (or just one driver) are installed in the sandbox. The driver stub API is then set up, see 122 in FIG. 1A (step 262). The gateway 130 is then configured for driver-to-stub communication (step 264). The Virtual Machine 126 is provided access to shared memory (see also discussion below with reference to FIG. 4). The installation process is then completed in step 268.

Figure 3A:
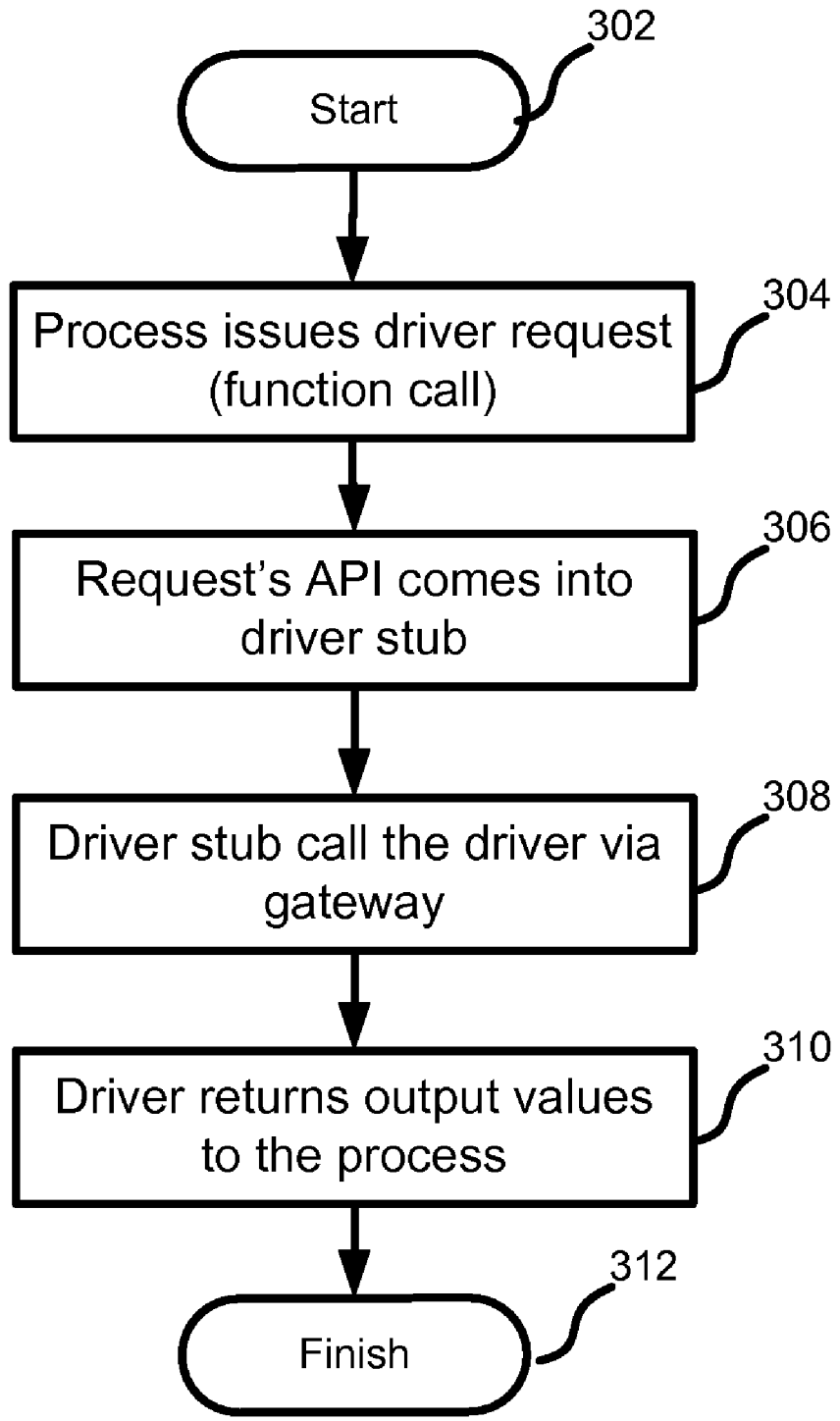
FIG. 3A illustrates the process of operating the Virtual Machine as a driver sandbox.

FIG. 3A illustrates the process of operating the Virtual Machine 126 as a driver sandbox. As shown in FIG. 3A, when a user process 108 or driver 114 issues a driver request, or a function call 112 (step 304), the function call or request 112 is received by the driver stub 120 (step 306). The driver stub 120 then calls the sandboxed driver 128 using the gateway 130 (step 308). The driver 128 returns function values, or output results 110 to the user process 108, driver 114, or calls other functions required for performing the requested operation (step 310). The process then finishes (step 312).

Figure 3B:
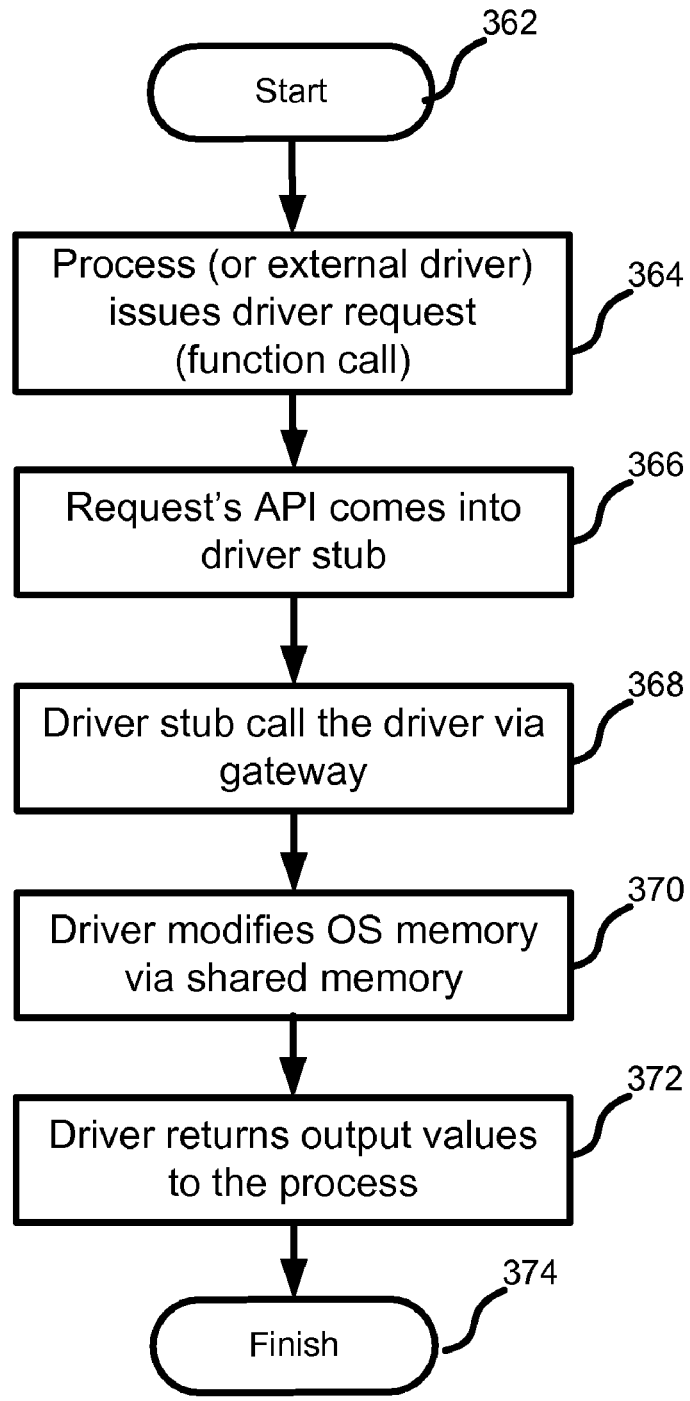
FIG. 3B illustrates another alternative embodiment of the invention.

FIG. 3B illustrates another alternative embodiment of the invention with regard to the functioning of the drivers 128 and gateway 130. As shown in FIG. 3B, once the redirection by the APIs 122, 124 starts (step 362), some process, or some other external driver issues a request (in other words, a function call) (step 364). The requests from the API is received by the driver stub 120 (step 366). The driver stub 120 then calls the driver 128, using the gateway 130 and the API redirection 124. The driver 128 then modifies the state of the operating systems memory using shared memory, see also discussion below regarding FIG. 4 (step 370).

Not all memory can be directly modified by the driver 128, but only that memory which is explicitly configured as "shared," for example, configured as shared for read, write, execute, access or any combination thereof.

In step 372, the driver 128 optionally returns the output values through the gateway 130 to whichever process or thread called the driver 128. The process then finishes in step 374.

Figure 4:
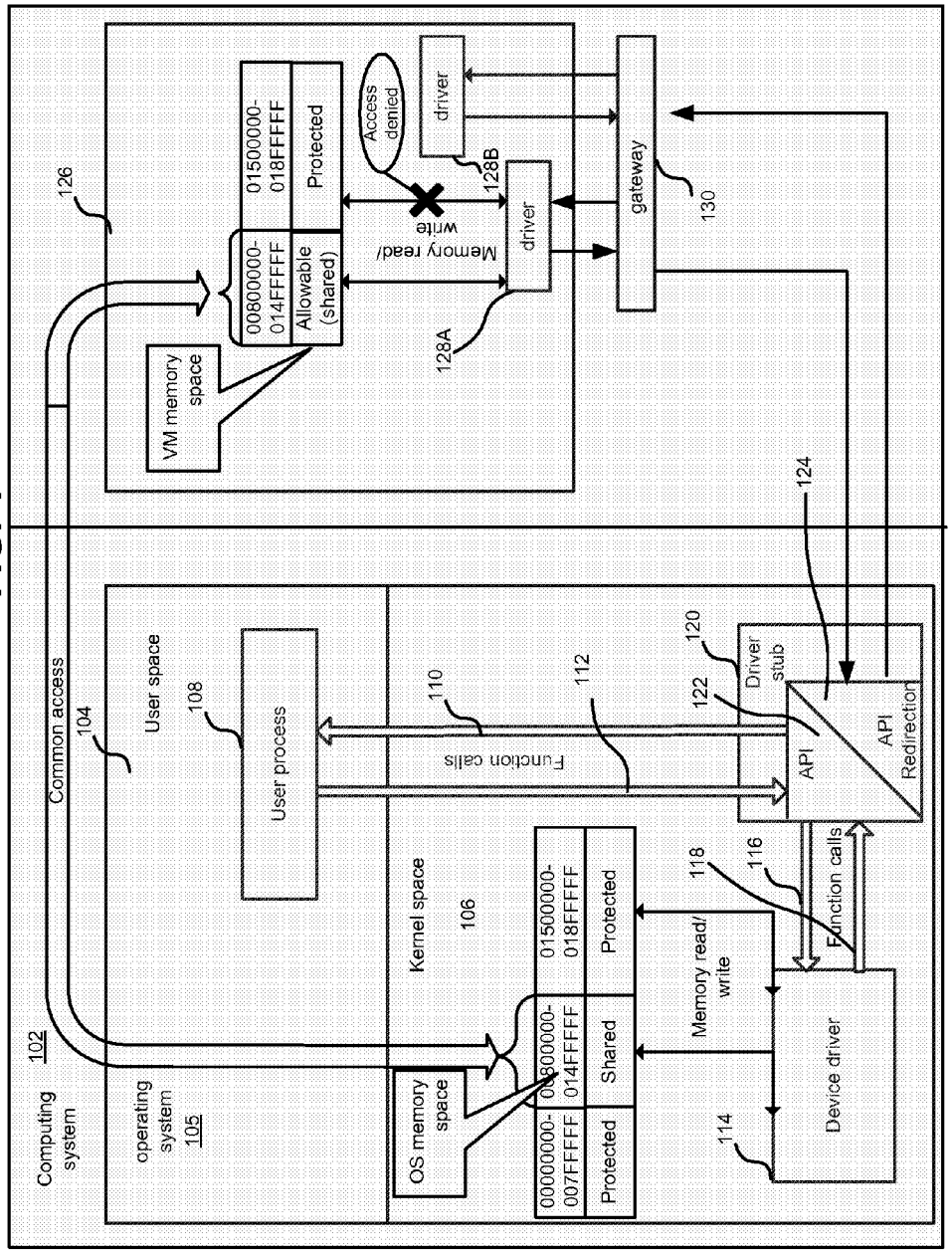
FIG. 4 illustrates an example of how the VM driver sandbox approach works in the context of a memory driver.

FIG. 4 illustrates an example of how the VM driver sandbox approach works in the context of a memory driver. FIG. 4 should be viewed in conjunction with FIG. 1A. Shown in FIG. 4, in addition to the elements already shown in FIG. 1A, is a portion of the computer's memory, where some of the memory that can be accessed by the operating system's memory driver is VM—protected, and some is shared with the Virtual Machine 126. The Virtual Machine 126 can only access the shared memory, and cannot access any of the protected memory in the Primary OS kernel. As further shown in FIG. 4, an attempt by the VM to access a protected or some other portion of the memory would be denied, triggering a page fault, or some other condition that would allow the gateway 130, or the operating system 105 to intercept that attempt. However, an attempt to access a shared portion of the memory would be permitted. In one embodiment attempts to access to non-shared memory is simply ignored.

Figure 5:
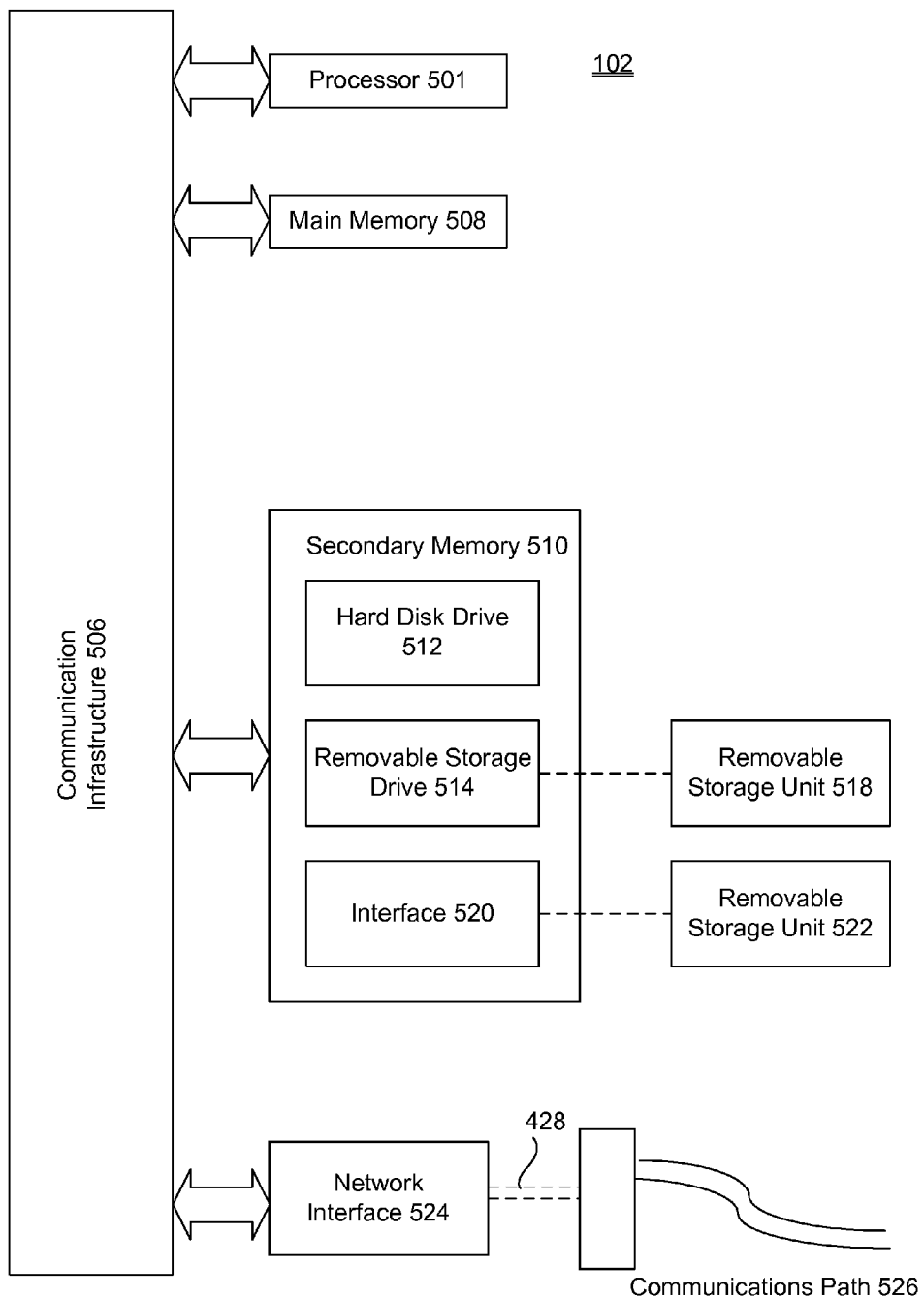
FIG. 5 illustrates an example of a computer on which the invention may be implemented.

An example of the computing system 102 is illustrated in FIG. 5. The computing system 102 includes one or more processors, such as processor 501. The processor 501 is connected to a communication infrastructure 506, such as a bus or network. Various software implementations are described in terms of this exemplary computer system. After reading this description, it will become apparent to a person skilled in the relevant art how to implement the invention using other computer systems and/or computer architectures.

Computing system 102 also includes a main memory 508, preferably random access memory (RAM), and may also include a secondary memory 510. The secondary memory 510 may include, for example, a hard disk drive 512 and/or a removable storage drive 514, representing a magnetic tape drive, an optical disk drive, etc. The removable storage drive 514 reads from and/or writes to a removable storage unit 518 in a well known manner. Removable storage unit 518 represents a magnetic tape, optical disk, or other storage medium that is READ by and written to by removable storage drive 514. As will be appreciated, the removable storage unit 518 can include a computer usable storage medium having stored therein computer software and/or data.

In alternative implementations, secondary memory 510 may include other means for allowing computer programs or other instructions to be loaded into computing system 102. Such means may include, for example, a removable storage unit 522 and an interface 520. An example of such means may include a removable memory chip (such as an EPROM, or PROM) and associated socket, or other removable storage units 522 and interfaces 520 which allow software and data to be transferred from the removable storage unit 522 to computing system 102.

Computing system 102 may also include one or more communications interfaces, such as communications interface 524. Communications interface 524 allows software and data to be transferred between computing system 102 and external devices. Examples of communications interface 524 may include a modem, a network interface (such as an Ethernet card), a communications port, a PCMCIA slot and card, etc. Software and data transferred via communications interface 524 are in the form of signals 528 which may be electronic, electromagnetic, optical or other signals capable of being received by communications interface 524. These signals 528 are provided to communications interface 524 via a communications path (i.e., channel) 526. This channel 526 carries signals 528 and may be implemented using wire or cable, fiber optics, an RF link and other communications channels. In an embodiment of the invention, signals 528 comprise data packets sent to processor 501. Information representing processed packets can also be sent in the form of signals 528 from processor 501 through communications path 526.

The terms "computer program medium" and "computer usable medium" are used to generally refer to media such as removable storage units 518 and 522, a hard disk installed in hard disk drive 512, and signals 528, which provide software to the computing system 102.

Computer programs are stored in main memory 508 and/or secondary memory 510. Computer programs may also be received via communications interface 524. Such computer programs, when executed, enable the computing system 102 to implement the present invention as discussed herein. In particular, the computer programs, when executed, enable the processor 501 to implement the present invention. Where the invention is implemented using software, the software may be stored in a computer program product and loaded into computing system 102 using removable storage drive 514, hard drive 512 or communications interface 524.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method of providing driver functionality in a computer, the method comprising:

installing a full-functional host operating system (OS) on the computer;

forming at least one isolated sandbox running under control of a common supporting means;

during an attempt to install a host driver in the host operating system, installing a driver stub in the host operating system to replace the host driver, wherein the stub is installed in low-level kernel space and is accessible from the at least one isolated sandbox, wherein the stub supports all Application Programming Interface (API) function calls supported by the host driver, including API interfaces and API call parameters;

installing a sandbox driver in one of the isolated sandboxes; and using a gateway between the driver stub and the sandbox driver running inside the sandbox to provide an interface for redirecting Application Programming Interface (API) requests from the driver stub to the sandbox driver for execution of the requests in the sandbox instead of in the host OS, and for transmitting responses back from the sandbox driver to the host operating system, wherein the stub provides access to functionality of the sandbox driver in the sandbox via the gateway and invokes the sandbox driver through the gateway and using the redirection;

wherein the sandbox driver uses the stub through the gateway to interface to host OS Application Programming Interface.

2. The method of claim 1, wherein the sandbox driver directly uses at least some system resources.

3. The method of claim 2, wherein the system resources include hardware resources.

4. The method of claim 1, further comprising a controlled memory area shared for common access of the host operating system by at least some of the sandboxes, wherein the controlled memory area is used for processing requests.

5. The method of claim 4, wherein access level parameters of the controlled memory area are dynamically changed.

6. The method of claim 1, further comprising a controlled memory area being shared for common access of the host operating system by at least some of the sandboxes, wherein the controlled memory area is used for direct access of the sandbox driver to the host operating system resources.

7. The method of claim 1, wherein, in the event of malfunction of the sandbox driver in the sandbox, the sandbox is re-initialized without notifying a request originator.

8. The method of claim 7, wherein the sandbox re-initialization further comprises any of: sandbox driver debugging, sandbox driver reinstallation and sandbox driver re-configuration.

9. The method of claim 7, wherein the gateway repeats driver call after the sandbox re-initialization.

10. The method of claim 1, wherein the computer further comprises at least two sandbox drivers installed in different sandboxes.

11. The method of claim 1, wherein the sandbox driver allocates resources on a host operating system (OS) kernel level, and wherein allocated resources are associated in the host OS kernel level with driver stub.

12. The method of claim 1, wherein the sandboxes are implemented as isolated Virtual Machines running on the computer, and the common supporting means for the sandboxes includes using a Virtual Machine Monitor and a Hypervisor.

13. The method of claim 1, wherein the sandboxes share system resources.

14. The method of claim 1, wherein the sandbox is configured during boot loading of the computer.

15. The method of claim 1, wherein the sandbox is configured during boot loading of the operating system.

16. The method of claim 1, wherein the sandbox is loaded based on a preconfigured snapshot of a virtual machine.

17. The method of claim 1, wherein the sandbox is installed after starting the virtual machine from a snapshot, the sandbox being configured based on the snapshot.

18. A system for managing driver installation comprising:
a full-fledged host operating system running on the computer and having an operating system (OS) kernel;
an isolated sandbox implemented under control of the host operating system;
a sandbox driver running in the sandbox;
a driver stub installed in the host operating system, wherein the stub is installed in low-level kernel space and is accessible from the at least one isolated sandbox; and
a gateway that provides an interface from the host OS to the sandbox driver in the sandbox by redirecting Application Programming Interface (API) requests from the driver stub to the sandbox driver for execution of the requests in the sandbox instead of in the host OS, and transmits responses back from the sandbox driver to the host operating system,
wherein the stub provides access to functionality of the sandbox driver via the gateway and invokes the sandbox driver through the gateway and using the redirection,
wherein the stub supports all Application Programming Interface (API) function calls supported by the sandbox driver, including API interfaces and API call parameters,
wherein the sandbox driver uses the driver stub through the gateway to transmit and receive driver calls and driver parameters to host OS Application Programming Interface.

19. The system of claim 18, wherein the driver calls are issued by user applications.

20. The system of claim 18, wherein the driver calls are issued by other drivers.

21. A method for installing a driver comprising:
on a computer having a host operating system, initiating an isolated sandbox under the host operating system;
installing a driver stub in the host operating system to replace a host driver, wherein the stub is installed in low-level kernel space and is accessible from the at least one isolated sandbox, wherein the stub redirects Application Programming Interface (API) requests to a sandbox driver the isolated sandbox for execution of the requests in the sandbox instead of in the host OS, and transmits responses back from the sandbox driver to the host operating system, wherein the stub provides access to functionality of the sandbox driver in the sandbox via a gateway and invokes the sandbox driver through the gateway and the redirection,
wherein the stub supports all Application Programming Interface (API) function calls supported by the sandbox driver, including API interfaces and API call parameters;
launching the sandbox driver in the isolated sandbox;
using a gateway that interfaces from the host Operating System (OS) kernel to the sandbox driver in the isolated sandbox for providing communication between the stub and the sandbox driver; and
initiating an Application Programming Interface (API) redirection process that redirects driver calls to the sandbox driver via the gateway and returns a result of driver call from the isolated sandbox via the gateway,
wherein the gateway uses driver call and driver output parameters for interfacing to the API.

22. A non-transitory computer useable medium for providing driver functionality, the computer useable medium having computer program logic stored thereon and executing on at least one processor, the computer program logic comprising:
computer program code means for installing a host operating system on the computer;
computer program code means for forming a plurality of isolated sandboxes running on the computer under control of the host operating system;
computer program code means for installing a driver stub in the host operating system to replace a host driver, wherein the stub is installed in low-level kernel space and is accessible from the at least one isolated sandbox;
computer program code means for installing a sandbox driver in one of the isolated sandboxes,
wherein the sandbox driver directly uses at least part of system resources; and
computer program code means for using a gateway between the driver stub and the installed driver to provide an interface for redirecting Application Programming Interface (API) requests from the sandbox driver stub to the driver running inside the sandbox for execution of the requests in the sandbox instead of in the host OS,
wherein the stub provides access to functionality of the sandbox driver via the gateway and invokes the sandbox driver through the gateway and using the redirection, wherein the stub supports all Application Programming Interface (API) function calls supported by the sandbox driver, including API interfaces and API call parameters, and wherein the gateway uses driver call and driver output parameters for interfacing to host OS Application Programming Interface.

23. A method for installing a driver comprising:

on a computer having a host operating system running in operating system kernel space, initiating a sandbox running in user space;

installing a driver stub in the host operating system to replace a host driver, wherein the stub is installed in low-level kernel space and is accessible from the at least one isolated sandbox, wherein the stub redirects Application Programming Interface (API) requests to a sandbox driver for execution of the requests in the sandbox instead of in the host OS, and transmits responses back from the sandbox driver to the host operating system, wherein the stub provides access to functionality of the sandbox driver via the gateway and invokes the sandbox driver through the gateway and the redirection, wherein the stub supports all Application Programming Interface (API) function calls supported by the sandbox driver, including API interfaces and API call parameters;

launching the sandbox driver in the sandbox;

initiating a gateway that interfaces to the sandbox driver; and initiating an Application Programming Interface (API) redirection module that redirects driver calls from a user application to the gateway and then to the sandbox driver, and returns a result of the driver call from the gateway back to the user application through the stub, wherein the gateway uses driver call and driver output parameters for interfacing to the API.

24. A method for installing a driver comprising:

on a computer having a host operating system running in a host operating system (OS) kernel space, initiating a Virtual Machine with a Virtual Machine Monitor (VMM) running in user space;

installing a driver stub in the host OS kernel space to replace a host driver in the host OS, wherein the stub is installed in low-level kernel space and is accessible from the VM, wherein the stub redirects Application Programming Interface (API) requests to a guest driver for execution of the requests in the sandbox instead of in the host OS, and transmits responses back from the guest driver to the host operating system, wherein the stub provides access to functionality of the guest driver in the sandbox via the gateway and invokes the guest driver through the gateway and the redirection, wherein the stub supports all Application Programming Interface (API) function calls supported by the guest driver, including API interfaces and API call parameters;

initiating a gateway that interfaces from the driver stub to the guest driver via the VMM; and initiating redirection of driver calls from a user application to the guest driver using the stub and returning a result of the driver call from the guest driver to the stub and then back to the user application, wherein the gateway between the driver stub and the guest driver running inside the VM transmits requests from the driver stub to the guest driver and transmits responses back from the guest driver to the driver stub, and wherein the gateway uses driver call and driver output parameters for interfacing to host OS Application Programming Interface.

25. The method of claim 24, wherein the guest driver directly uses at least some system resources.

26. The method of claim 24, further comprising a controlled memory area being shared for common access of the host operating system and the Virtual Machine.

27. The method of claim 24, wherein the host operating system and the Virtual Machine have memory spaces that are, at least partially, isolated from each other.

28. The method of claim 24, wherein the guest driver allocates resources on the host operating system kernel space, and wherein allocated resources are associated in the operating system kernel with driver stub.

* * * * *